United States Patent Office 3,231,633
Patented Jan. 25, 1966

---

3,231,633
ALKYLATION PROMOTER
George M. Kramer, Berkeley Heights, N.J., assignor to Esso Research and Engineering Company, a corporation of Delaware
No Drawing. Filed Nov. 27, 1963, Ser. No. 326,368
10 Claims. (Cl. 260—683.51)

The present invention relates to an improved alkylation process. In particular, this invention concerns the production of a product containing $C_8$ hydrocarbons by the alkylation of paraffin hydrocarbons with olefins. More particularly, the invention relates to an acid catalyzed butane-butylene alkylation process having a high selectivity for the production of trimethylpentanes, i.e. (2,2,4-trimethylpentane).

The acid catalyzed addition of an alkane to an alkene to form a desired product is well-known. The reactants are generally contacted in the liquid phase at temperatures usually below about 100 °F., although on occasion, higher temperatures may be utilized and at pressures varying from ambient to superatmospheric.

Of particular importance within the realm of alkylation is the reaction of butylenes and isobutane to form octane and, in particular, isooctane. The butylenes, generally a mixture of normal and iso, are reacted in the liquid phase in the presence of a strong acid such as, for example, fluorosulfonic acid or sulfuric acid, at a temperature of 0 to 100° F. and at a pressure of 10 to 150 p.s.i.g. The reaction can be postulated as proceeding as follows:

(1)

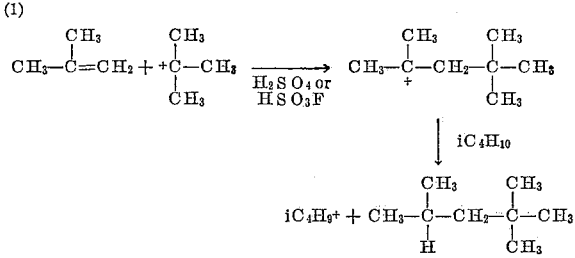

(2)

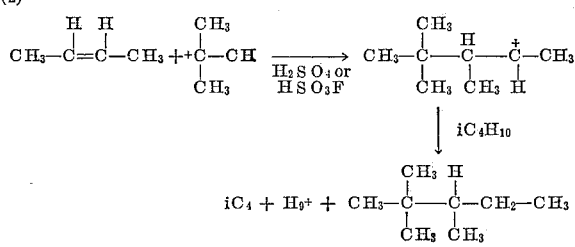

The most important rate determining factor in this reaction is the hydride extraction step. The hydride extraction step refers to the removal of an $H^-$ from the $iC_4H_{10}$ and the subsequent or simultaneous addition of the $H^-$ to $C_8+$ to form trimethylpentane from the appropriate ion. Alkylation reactions, as exemplified by the strong acid catalyzed reaction of butylenes and isobutane to form octane, have been plagued with several difficulties in the past. While these difficulties will be discussed hereinafter with respect to the formation of octane, it is to be understood that they are equally applicable to any alkylation reaction. The basic problem concerns the fact that the formation of the 1:1 olefin-paraffin adduct, e.g. octane, at the start of the reaction does not proceed as rapidly as would be desired. Thus, the adduct ions, e.g. $C_8+$ ions, during the initial period of the reaction participate in undesirable side reactions at a much faster rate than the desirable but slower hydride extraction reaction to form the stable 1:1 olefin-paraffin adduct, e.g. octane. These side reactions lead to the formation of $C_{12}+$ products which then undergo cracking reactions to form undesirable lighter hydrocarbons such as, for example, $C_5$, $C_6$ and $C_7$ light alkylate components. The result, of course, is to minimize the production of the desired $C_8$ products and to lower the octane number of the products obtained. This predominance of the undesirable formation of greater than 1:1 adducts generally continues for a period of time, at the end of which period there is a marked, rather abrupt change in the selectivity of the alkylation reaction to the formation of the 1:1 adduct. The transitional period during which the undesirable side reaction is selectively predominating over the desirable formation of this 1:1 adduct is generally referred to as the "induction period."

While the reason for this induction period effect is not known for certain, it is believed that during the induction period, material is forming which is surface active and the change in selectivity which is observed accompanies a change in the nature of the acid surface. That is, at this time, the surface-active material comes to the surface of the acid and serves to control the reaction. As a rule, this induction period will vary with the nature of the feed and the catalyst used, but generally lasts about 200 hours in straight fluorosulfonic acid and approximately ¼ of that with a catalyst consisting of sulfuric acid.

Where fluorosulfonic acid is to be used as a catalyst, the induction period may be reduced by using fluorosulfonic acid in combination with up to about 50 wt. percent $H_2SO_4$ and, preferably, up to about 25 wt. percent $H_2SO_4$. While the combined acids result in a reduced induction period, the period is still consideraby longer than that found with the use of $H_2SO_4$ alone.

It has been unexpectedly found, according to this invention, that improved selectivity and decreased induction period can be achieved in strong acid catalyzed alkylation reactions if the hydrocarbon reaction mixture is contacted at alkylation reaction conditions in the presence of a modified acid catalyst, said catalyst comprising a strong acid in combination with a large, stable, surface-active cation. A particularly useful cation is the tertiary carbonium ion. For purposes of definition, the term "cation" refers to a positively charged atom, radical or group of atoms which will pass to the cathode during electrolysis. By a large cation is meant one which has a radius of 3.47 A. to 9.67 A. Surface-active compounds are those which affect interfacial tension between two liquids. A cation is considered stable if the strength of $H_2SO_4$ in which the ion is half formed is 85%, preferably 50% or less.

A wide variety of surfactants can be protonated or dissociated to form a carbonium, allylic carbonium, tetraalkyl ammonium, tetraaryl ammonium, phosphonium, oxonium, ammonium, sulfonium or similar cations which may be readily utilized within the scope of this invention. Examples of the above are:

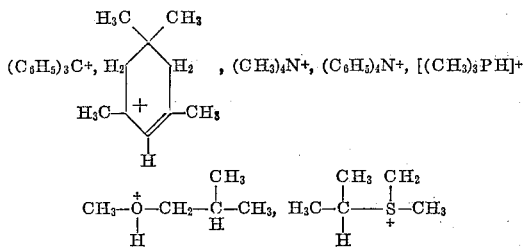

These are only illustrations of cations which may be utilized and a great variety of compounds of varying molecular weights and carbon chains may be utilized.

A cation, and by way of example a large tertiary carbonium ion, may be obtained by dissolving a compound such as triphenylmethyl chloride in an acid thereby obtaining HCl and the ion. The required cation may also be obtained by dissolving triphenylmethyl alcohol in sulfuric acid thereby obtaining water and the ion. This general method is known as solvolysis. Alternatively, the ion may be obtained by a hydride transfer such as from triphenylmethane to a carbonium ion present in the acid.

A carbonium ion is a group of atoms that contains a carbon atom bearing only six electrons. A tertiary carbonium ion is a carbon atom bearing only six electrons and is also joined to three other carbon atoms. For an extensive discussion of carbonium ions and their formation and reactions see Morrison and Boyd, Organic Chemistry, Allyn and Bacon, Inc. (1959), pages 116–121, 138–139, 142–143, 256–259 and 375–376.

The large, stable and surface-active tertiary carbonium ion, triphenylmethyl ion, which was used for illustration above, is particularly effective in this invention. This ion is more than half formed in 50% $H_2SO_4$, is surface active and has a radius of 5.77 A. However, the other large, stable and surface-active cations named above would be equally as effective in this invention. Another alternative in the carbonium ion family would be the tricyclopropylmethyl ion. Of course, any large, stable, surface-active compound forming divalent or trivalent cations would be equally as effective.

Quantities of large cations to be employed for most satisfactory results as a constituent of the modified catalyst will vary between 0.01 and 10 mole percent of the catalyst and preferred results may be obtained generally with 0.1 to 3 mole percent of the catalyst when using the triphenylmethyl carbonium ion in particular. Excellent results with the hereinbefore described cations, particularly tertiary carbonium ions, have been obtained at concentrations between about 0.5 and 1.5 mole percent of the catalyst while the quaternary ammonium salts appear to work best at concentrations of about 0.6 mole percent of the catalyst.

While not wishing to be bound by any particular mechanism, it is presently believed that the hydride transfer is considered to be the rate determining step in alkylation. That is to say, in the formation of octane for example, the transfer of negative hydride ions from isobutane to an intermediate positively charged isooctyl ion controls the reaction speed and with it the product quality obtained. Too little hydride transfer leads to poor quality alkylate containing pentanes, hexanes and heptane. Furthermore, poor hydride transfer ability gives rise to low quality octyl isomers. Large, stable, surface-active cations such as the triphenylmethyl carbonium ion which has been referred to above, condition the turface to enhance the hydride transfer reaction and also slow processes that normally lead to unwanted side reactions such as polymerization and cracking. This same result would, as is naturally to be expected, be achieved by all the other large, stable, surface-active cation which have been previously enumerated.

The use of large, stable, surface-active cations to speed hydride transfer reactions is particularly applicable to those alkylation reactions catalyzed by the strong Brönsted acids. The strong Brönsted acids are those substances which readily give up a proton. Large numbers of these acids are well-known to one skilled in the art. They would include all of the halogen acids, HF, HCl, HI and HBr as well as $H_2SO_4$, fluorosulfonic acid, chlorosulfonic and HB $(HSO_4)_4$. These are the acids used in the ($C_4$ to $C_{10}$) paraffin-($C_2$ to $C_{10}$) olefin, naphthene olefin and aromatic olefin alkylation. All of these reactions would be improved by the faster hydride transfer rates, less polymerization and cracking and better selectivity which would result from the addition of a large, stable, surface-active cation. Traditional alkylation conditions, i.e., pressure, temperature may be utilized. These conditions will be discussed subsequently.

In the same manner, the Lewis acids or electron pair acceptors are utilized as catalysts. The addition of large, stable, surface-active cations and, in particular, triphenylmethyl carbonium ions to catalyst systems involving the strong Lewis acids such as $AlBr_3$, $AlCl_3$, $BF_3$, $SbF_3$, $SbCl_5$, $SbBr_3$, $SbF_5$, $GaCl_3$ and $AsF_5$ will result in improved paraffin-olefin, naphthene-olefin and aromatic-olefin alkylation and also in better selectivity in the isomerization of light paraffins, e.g. $nC_4$ to $nC_{10}$ hydrocarbons, to highly branched isomers desirable as motor fuels.

The Lewis acid systems mentioned are normally used in conjunction with cocatalysts or promoters such as water, ethers, alcohols, olefins, HBr, etc., or on supports such as $Al_2O_3$, $SiO_2$, $B_2O_3$ and other equivalent mechanisms. In fact, this is implied within the very term "catalytic systems." Most of the systems are heterogeneous. The systems, therefore, involve the formation of carbonium ion intermediates at an acid-hydrocarbon interface and a method of controlling the reaction of any one system may presumably be extended to all others.

In general, any of the conventional catalytic alkylation reactions can be carried out by the process of the present invention. Thus, the alkylation reaction can comprise reaction of an isoparaffin with an olefin, or reaction of an aromatic hydrocarbon with an olefin or other alkylating agent, the reaction in each instance being carried out in the presence of a suitable alkylation catalyst. In place of an olefin as an alkylating agent, various alcohols and ethers, such as isopropyl alcohol, tert-butyl alcohol, secondary butyl alcohol, isopropyl ether, and the like, can be carried out in the presence of a suitable alkylation catalyst. Likewise, the corresponding akyl esters, such as the alkyl halides, sulfates, phosphates, fluorides of the olefins, may be used as the alkylation agent with an appropriate or compatible alkylation catalyst.

The alkylation reaction is carried out with the hydrocarbon reactants in the liquid phase; however, the reactants need not be normally liquid hydrocarbons. The reaction conditions can vary in temperature from sub-zero temperatures to temperatures as high as 200° F. and can be carried out at pressures varying from atmospheric to as high as 1,000 p.s.i. and higher, and space velocities ranging from about 0.01 to about 20. A variety of alkylation catalysts can be employed in the alkylation reaction. However, hydrofluoric and sulfuric acid are preferred.

As hereinbefore noted, sulfuric acid and fluorosulfonic acid are prime examples of strong acids which have been used as catalyst in the alkylation reactions. Once again, it should be noted that other strong acids such as HF may be utilized and what is said about sulfuric and fluorosulfonic acids would also true of a variety of strong acids. In particular, fluorosulfonic acid is a very effective catalyst for the reaction of isobutylene and isobutane to form octanes, especially the very desirable 2,2,4-trimethylpentane which is commonly referred to as isooctane. The most desired temperatures for the use of sulfuric acid would be between 30 and 75° F. and pressures of 10 to 150 p.s.i.g. When using fluorosulfonic acid, most desired temperatures are between 0 and 75° F. and pressures of 10 to 150 p.s.i.g. Both fluorosulfonic and sulfuric acid are characterized by the previously mentioned extended induction periods, although the induction period for fluorosulfonic acid is considerably longer than that for sulfuric acid.

The following specific examples are offered to illustrate the improvement of the instant invention.

EXAMPLE 1

A microalkylation reactor was operated at 50° F., a pressure of 100 p.s.i.g. and an olefin space velocity of 0.035 to 0.065 v./hr./v. the ratio of olefin, that is to say, $C_4$ olefin to $C_4$ isoparaffin in the feed to the reactor was 1 to 20. The actual feed employed was cis-2-butene and isobutane. The cation utilized was the triphenylmethyl carbonium ion (TPMC). The source of large triphenylmethyl carbonium ions was triphenylmethyl chloride. The paraffin and olefin in liquid form were admixed with one another and added to the H₂SO₄. They were then stirred vigorously. To illustrate the improvement of this invention, three different concentration levels of cations were employed, i.e. ½, 1.0 and 3.0 mole percent TPMC in 98% sulfuric acid. It was found that at a butene space velocity of 0.035 v./hr./v. with 1.0 mole percent TPMC, an exceptionally high quality alkylate was obtained. This alkylate was about 98% selective to total octanes. In addition, the major octane in the C₈ fraction was the high octane isomer 2,2,4-trimethylpentane (42%). These results may be compared with alkylate C₈ selectivity of 82 to 89% and about 33% 2,2,4-trimethylpentane in the C₈ fraction using unconditioned sulfuric acid.

*Table I*

|  | a | b | c | d |
|---|---|---|---|---|
| Mole percent TPMC ᵃ in H₂SO₄ | 0 | ½ | 1 | 3 |
| Olefin Space Velocity, v./hr./v | 0.035 | 0.035+ | 0.035 | 0.065 |
| Selectivity, percent C₈ in C₅+ | 89–82 | 96 | 97.5 | 93–87 |

ᵃ TPMC=triphenylmethylchloride.

Estimated motor octane numbers indicate that the acid containing 1% TPMC produces an alkylate of about 98 MON (115–350° FVT). This octane number compares to one of about 94–95 which was obtained with unmodified sulfuric acid showing a gain of at least 3–4 octane number when practicing the process of the present invention. In Table I we see that Run *a* which was conducted with no TPMC added to the acid, produced the lowest selectivity. Runs *b*, *c* and *d* produced much higher selectivity. The selectivity obtained in Run *c* was the highest, 97.5%. However, both Runs *b* and *d* also produced considerably more of the desired product than Run *a*. This clearly indicates the advantage to be gained from the addition of large cations to sulfonic acid in the alkylation reaction.

EXAMPLE 2

This example illustrates the induction period which is associated with the use of sulfuric and fluorosulfonic acids as catalysts for alkylation and, in particular, the alkylation of butylene and isobutane to form isooctane. The hydrocarbons were added to the acids and then agitated for good mixing. The temperature was 50° F. and the pressure was 100 p.s.i.g. in all cases.

*Table II*

| Catalyst | H₂SO₄ | 25% H₂SO₄, 75% HSO₃F | HSO₃F | H₂SO₄ +1% TPMC |
|---|---|---|---|---|
| Feed, Wt. Percent: |  |  |  |  |
| i-C₄H₁₀ | 94.15 | 94.15 | 94.15 | 95 |
| C₄H₈ | 5.85 | 5.85 | 5.85 | 5 |
| O.S.V., v./hr./v | 0.04 | 0.04 | 0.04 | 0.035 |
| Induction Period, Hrs | 40 | 125 | 210 | None |
| Production Distribution, Wt. Percent: |  |  |  |  |
| C₅–C₇ | ¹ 10.1 | 1–2 | 1–2 | 2.5 |
| C₈ | ¹ 89.9 | 98–99 | 98–99 | 97.5 |
| 224 TMP in C₈ | 36.0 | 50–60 | 50–60 | 40–55 |

¹ Analysis of best product.

In this table the large production of octane and, in particular, isooctane, which results from a fluorosulfonic acid catalyst used alone or in admixture with sulfuric acid, was considerably better than that obtained with a pure sulfuric acid catalyst. However, the induction period of 210 hours for a pure fluorosulfonic acid catalyst and 125 hours for the mixed catalyst was considerably worse than the 40-hour period which resulted from the use of pure sulfuric acid as the catalyst.

EXAMPLE 3

In this example, conditions are identical to those of Example 2 except that about 1 mole percent (based on acid catalyst) of triphenylmethylchloride is added to the pure H₂SO₄ and HSO₃F catalyst. The product obtained is about 98% C₈ which is substantial improvement and the induction period is essentially eliminated. With HSO₃F, the induction period is reduced to less than 5 hours or the time necessary to line out the reactor. Thus, the addition of a large, surface-active carbonium ion to an acid strong enough to induce alkylation, immediately conditions the acid and substantially eliminates the induction period.

EXAMPLE 4

In this example, conditions are identical to those of Example 2 except that 1 mole percent of an allylic carbonium ion is added to both the H₂SO₄ and the fluorosulfonic acid catalyst. The allylic carbonium is added in the form of

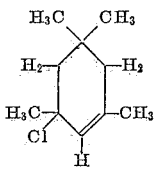

The product obtained is about 98% C₈ and the induction period is substantially eliminated for both the sulfuric acid and the fluorosulfonic acid catalyst.

EXAMPLE 5

In this example, conditions are identical to those of Example 2 except that 1 mole percent of a tetramethyl ammonium ion is added to both the H₂SO₄ and the fluorosulfonic acid catalyst. The tetramethyl ammonium ion is added in the form of tetramethyl ammonium chloride. The product obtained is about 98% C₈ and the induction period is substantially eliminated for both the sulfuric acid and the fluorosulfonic acid catalyst.

EXAMPLE 6

In this example, conditions are identical to those of Example 2 except that 1 mole percent of a tetraphenyl ammonium ion is added to both the H₂SO₄ and the fluorosulfonic acid catalyst. The tetraphenyl ammonium ion is added in the form of tetraphenyl ammonium chloride. The product obtained is about 98% C₈ and the induction period is substantially eliminated for both the sulfuric acid and the fluorosulfonic acid catalyst.

EXAMPLE 7

In this example, conditions are identical to those of Example 2 except that 1 mole percent of a trimethyl phosphonium ion is added to both the H₂SO₄ and the fluorosulfonic acid catalyst. The trimethyl phosphonium ion is added in the form of trimethyl phosphonium chloride. The product obtained is about 98% C₈ and the induction period is substantially eliminated for both the sulfuric acid and the fluorosulfonic acid catalyst.

EXAMPLE 8

In this example, conditions are identical to those of Example 2 except that 1 mole percent of a methyl isobutyl oxonium ion is added to both the H₂SO₄ and the fluorosulfonic acid catalyst. The methyl isobutyl oxonium ion is added in the form of methyl isobutyl oxonium chloride. The product obtained is about 98% C₈ and the induction period is substantially eliminated for both the sulfuric acid and the fluorosulfonic acid catalyst.

EXAMPLE 9

In this example, conditions are identical to those of Example 2 except that 1 mole percent of a dimethyl isopropyl sulfonium ion is added to both the $H_2SO_4$ and the fluorosulfonic acid catalyst. The dimethyl isopropyl sulfonium ion is added in the form of dimethyl isopropyl sulfonium chloride. The product obtained is about 98% $C_8$ and the induction period is substantially eliminated for both the sulfuric acid and the fluorosulfonic acid catalyst.

EXAMPLE 10

In this example, conditions are identical to those of Example 2 except that 1 mole percent of a tricyclopropyl methyl ion is added to both the $H_2SO_4$ and the fluorosulfonic acid catalyst. The tricyclopropyl methyl ion is added in the form of tricyclopropyl methyl chloride. The product obtained is about 98% $C_8$ and the induction period is substantially eliminated for both the suluric acid and the fluorosulfonic acid catalyst.

What is claimed is:

1. An improved process for the alkylation of butylenes with isobutane to form a maximum amount of isooctane while minimizing cracking which comprises contacting said butylenes and said isobutane at a temperature of 30 to 75° F. and a pressure of 10 to 150 p.s.i.g. with a catalyst comprising sulfuric acid and 0.01 to 10 mole percent of an ionizable triphenylmethyl salt.

2. An improved process for the alkylation of butylenes with isobutane to form a maximum amount of isooctane while minimizing cracking which comprises contacting of said butylenes and said isobutane at a temperature of 10 to 75° F. and a pressure of 10 to 150 p.s.i.g. with a catalyst comprising fluorosulfonic acid and 0.01 to 10 mole percent of an ionizable triphenylmethyl salt.

3. An improved process for the alkylation of butylenes with isobutane to form a maximum amount of octanes while minimizing the iduction period which comprises contacting the said butylenes and the said isobutane with a catalyst, the said catalyst consisting of a mixture of fluorosulfonic acid, sulfuric acid and an ionizable triphenylmethyl salt.

4. The process of claim 3 where the said ionizable triphenylmethyl salt is present in an amount of 0.01 to 10 mole percent.

5. A process for carrying out an alkylation reaction while minimizing cracking and the induction period which comprises contacting a hydrocarbon mixture containing an alkylatable hydrocarbon and an alkylating agent at alkylation conditions with a catalyst composition comprising a strong acid selected from the group consisting of sulfuric acid, hydrofluoric acid and fluorosulfonic acid and a catalyst promoter selected from the group consisting of an ionizable triphenylmethyl salt and an ionizable tricyclopropylmethyl salt.

6. An improved process for the alkylation of an olefin with a paraffin while minimizing cracking and the induction period which comprises contacting said paraffin and said olefin at reaction conditions with a catalyst comprising sulfuric acid and an ionizable triphenylmethyl salt.

7. An improved process for the alkylation of an olefin with a paraffin while minimizing cracking which comprises contacting said olefin and said paraffin at reaction conditions with a catalyst comprising an acid selected from the group consisting of sulfuric acid, hydrofluoric acid and fluorosulfonic acid; and 0.01 to 10 mole percent of an ionizable triphenylmethyl salt.

8. The process of claim 7 wherein said contacting takes place at a temperature of 30 to 75° F. and a pressure of 10 to 150 p.s.i.g.

9. The process of claim 7 wherein said acid is sulfuric acid.

10. The process of claim 7 wherein said acid is HF.

References Cited by the Examiner

UNITED STATES PATENTS

| 2,435,028 | 1/1948 | Bradley | 260—683.63 X |
| 2,437,544 | 3/1948 | Marisic | 260—683.63 X |
| 2,441,102 | 5/1948 | Meadow | 260—683.51 |

OTHER REFERENCES

Kobe, K. A. and McKetta, J. J., Advances in Petroleum Chemistry and Refining, vol. 1, Interscience, N.Y., 1958, p. 347–363.

DELBERT E. GANTZ, *Primary Examiner.*

ALPHONSO D. SULLIVAN, PAUL M. COUGHLAN,
*Examiners.*